US006975335B2

(12) United States Patent
Watanabe

(10) Patent No.: US 6,975,335 B2
(45) Date of Patent: Dec. 13, 2005

(54) METHOD OF DISPLAYING MAGNIFIED AND REDUCED AREAS AND APPARATUS THEREOF

(75) Inventor: Terue Watanabe, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 09/733,942

(22) Filed: Dec. 11, 2000

(65) Prior Publication Data

US 2001/0012409 A1 Aug. 9, 2001

(30) Foreign Application Priority Data

Dec. 28, 1999 (JP) ................................ 11-372161

(51) Int. Cl.[7] ................................ G09G 5/00
(52) U.S. Cl. ................................ 345/660
(58) Field of Search ................................ 345/660, 661, 345/664, 666, 667, 668, 670, 671

(56) References Cited

U.S. PATENT DOCUMENTS

| | | | | |
|---|---|---|---|---|
| 4,698,778 | A * | 10/1987 | Ito et al. | 345/667 |
| 4,790,028 | A * | 12/1988 | Ramage | 382/298 |
| 5,323,173 | A * | 6/1994 | Sakuma et al. | 345/668 |
| 5,400,051 | A * | 3/1995 | Krueger, Jr. | 345/667 |
| 5,670,984 | A * | 9/1997 | Robertson et al. | 345/585 |
| 5,680,629 | A * | 10/1997 | Slayden et al. | 715/527 |
| 5,689,287 | A * | 11/1997 | Mackinlay et al. | 345/427 |
| 5,737,507 | A * | 4/1998 | Smith | 345/666 |
| 5,812,111 | A * | 9/1998 | Fuji et al. | 345/24 |
| 5,818,975 | A * | 10/1998 | Goodwin et al. | 382/274 |
| 5,920,327 | A * | 7/1999 | Seidensticker, Jr. | 345/561 |
| 5,943,679 | A * | 8/1999 | Niles et al. | 715/526 |
| 6,044,385 | A * | 3/2000 | Gross et al. | 715/526 |
| 6,081,277 | A * | 6/2000 | Kojima | 345/661 |
| 6,085,202 | A * | 7/2000 | Rao et al. | 715/509 |
| 6,208,342 | B1 * | 3/2001 | Mugura et al. | 345/810 |
| 6,219,052 | B1 * | 4/2001 | Gould | 345/661 |
| 6,229,536 | B1 * | 5/2001 | Alexander et al. | 345/440.1 |
| 6,388,679 | B1 * | 5/2002 | Kluck et al. | 345/698 |
| 6,417,867 | B1 * | 7/2002 | Hallberg | 345/660 |
| 2002/0080151 | A1 * | 6/2002 | Venolia | 345/660 |
| 2002/0085035 | A1 * | 7/2002 | Orbanes et al. | 345/764 |
| 2002/0135601 | A1 * | 9/2002 | Watanabe et al. | 345/660 |
| 2003/0052900 | A1 * | 3/2003 | Card et al. | 345/660 |

FOREIGN PATENT DOCUMENTS

| | | |
|---|---|---|
| JP | 05-323933 | 12/1993 |
| JP | 07-334665 | 12/1995 |
| JP | 08-305692 | 11/1996 |
| JP | 11-109945 | 4/1999 |
| JP | 11-305755 | 11/1999 |

* cited by examiner

*Primary Examiner*—Ryan Yang
(74) *Attorney, Agent, or Firm*—Louis Herzberg

(57) ABSTRACT

Magnified and/or reduced areas of a display are easily determined by the shades of color and a pattern densities which correspond to the magnification or reduction ratio of areas of the display. The areas that have been magnified and/or reduced are presented by varying color intensity within areas reduced in size displayed with a deep hue in color to indicate that the area is compressed and a magnified area is displayed with a lighter color to indicate its expansion. Moreover, images of the display can be presented with a specification corresponding to each magnification or reduction ratio by linking the display with a movement of a pointing device, thus realizing a very easy-to-operate user interface.

16 Claims, 10 Drawing Sheets

(A) INITIAL DISPLAY
201

(B) PRIOR ART
221

(C) VIEW SHOWING CASE TO WHICH PRESENT INVENTION IS APPLIED
251

CONSTITUTIONAL VIEW OF HARDWARE

CONSTITUTIONAL VIEW OF SOFTWARE

CONSTITUTIONAL VIEW OF RECORD DESIGN MODULE

FLOWCHART OF RECORD DESIGN

FLOWCHART OF INITIAL SETUP/INITIAL DISPLAY

FLOWCHART OF MAGNIFICATION/REDUCTION RATIO INFORMATION GENERATING SECTION

FLOWCHART OF DRAWING SECTION

METHOD OF DISPLAYING MAGNIFIED AND REDUCED AREAS AND APPARATUS THEREOF

FIELD OF THE INVENTION

The present invention relates to a user interface capable of easily determining which area has been magnified/reduced and to which extent the area has been magnified/reduced at an editorial work for a diagram, a document or the like. More particularly, the present invention relates to a method capable of changing a display in accordance with magnifying/reducing operations by a user, and an apparatus thereof.

BACKGROUND OF THE INVENTION

Conventionally, when a portion of a diagram is desired to be magnified and displayed, it has been the practice of magnifying not only the objective area (portion) but also the whole diagram as shown in diagram 101 of FIG. 1. However, with this method, the whole diagram cannot be accommodated on the display area. Another conventional practice has been to magnify the portion of the diagram desired to be magnified, and of displaying it in the vicinity of an original diagram as shown in a diagram 102 of FIG. 1. With this procedure a display area other than the area for the original diagram is needed. Therefore, in order to magnify a portion desired to be displayed in detail and display the whole diagram, portions other than the portion desired to be displayed in detail are needed to be reduced in size on the display. When the magnified portion and the reduced portions are so mixed on a display screen, it has been extremely difficult to recognize which portion is magnified or reduced, and to which extent the portion is magnified or reduced.

Therefore one object of the present invention is to provide a method and apparatus for visually displaying a diagram where a portion is magnified or reduced in a manner that the magnified/reduced area thereof and the magnification/reduction ratio can be easily determined.

Another object of the present invention is to provide a system, which is capable of displaying the magnification/reduction ratio during the magnification/ reduction operation of a diagram, to enable an easy comparison between a changed operation area and the other areas.

BRIEF DESCRIPTION OF THE INVENTION

According to the present invention, diagram configuration information including display specification information such as the color and the pattern of the display are changed to characterize the magnification or reduction ratio of portions of a screen display. The display specification information including information concerning the shade of color and/or the pattern density are changed to reflect the magnification or reduction ratio as a ratio of the portions of the diagram magnified or reduced. For example, the display specification information for a reduced area calls for use of a deep or intense color in order to indicate that the area is compressed and the intensity is varied in accordance with the areas reduction ratio. Diagram linkage information determines whether or not an increase in the size of a certain portion of the diagram affects the other portions such that the other portions must be reduced so that the whole diagram can be accommodated in a screen.

The system of the present invention displays a shade of color and/or the pattern density corresponding to the scale change of various portions of a diagram in response to the movement of a pointing device across the screen display of the diagram. As the pointing device moves, calculates the magnification and/or reduction ratios for the other portions, it calculates the shade of color and the pattern density data corresponding to the magnification and/or reduction ratio for displaying in the diagram.

BRIEF DESCRIPTION OF THE DRAWINGS

The present invention will now be described by reference to a preferred embodiment and to figures, in which.

DETAILED DESCRIPTION OF THE PREFERRED EMBODIMENTS

Figure 1:
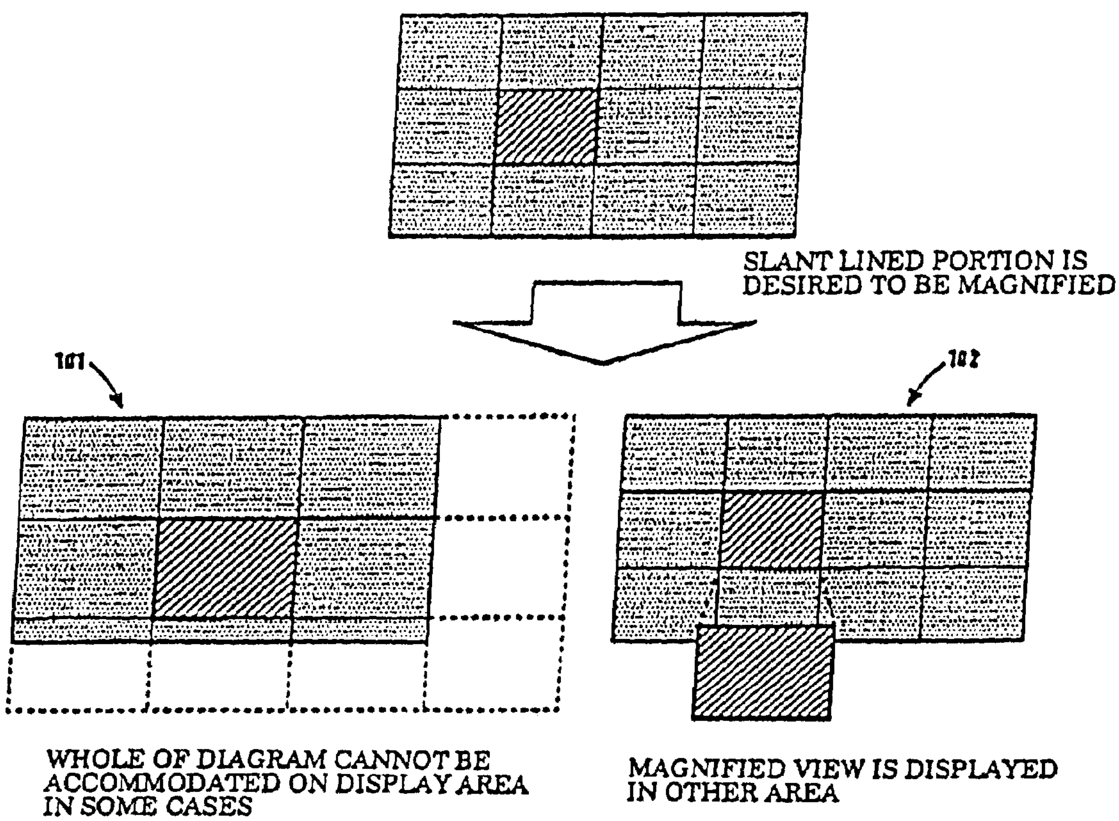
FIG. 1 is a diagram showing the conventional methods of magnifying a diagram.

Descriptions will be made for the present invention with reference to an embodiment of a record design as a part of a program development tool.

As shown in FIG. 2(A), record data contains variables such as "NAME", "BIRTHDAY", "ADDRESS" and "TEL", which are used in an application program. These variables are referred to as "data items.

Reference numeral 201 denotes an initial display of one record. This record includes five data items 202 to 206. Data item names 207, 208 and 209 are displayed on the data items where there is sufficient display area. Where a display area has insufficient space, a data item name denoted by numeral 211 is displayed when a cursor 210 of a pointing device points to the display area. A scale 212 appears across the top of the record data. In FIG. 2(A), the data items are displayed so as to have the size corresponding respectively to lengths of the data items.

Figure 2:
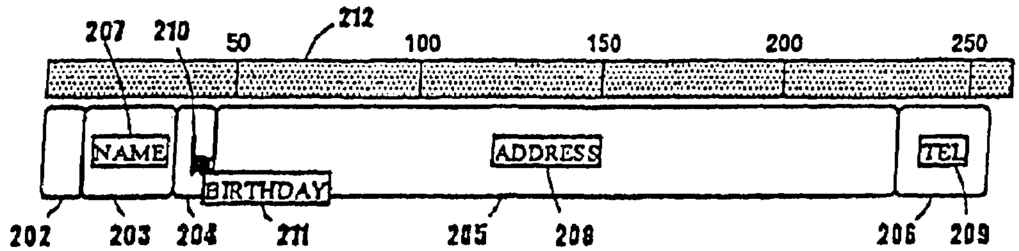
FIGS. 2A to 2C show screen presentations of records before and after the magnification and/or reduction of the portions.
Figure 2:
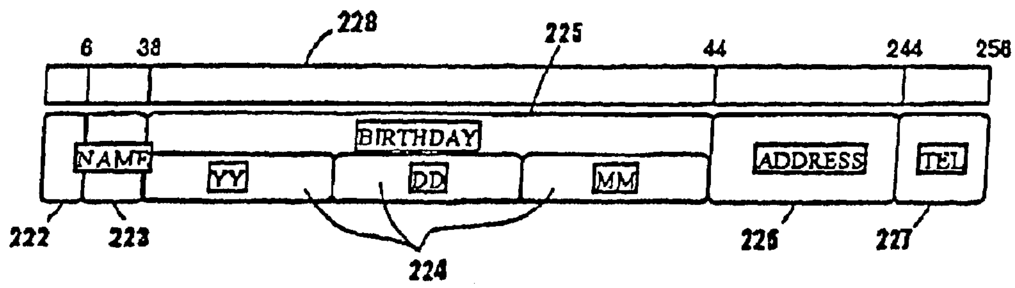
Figure 2:
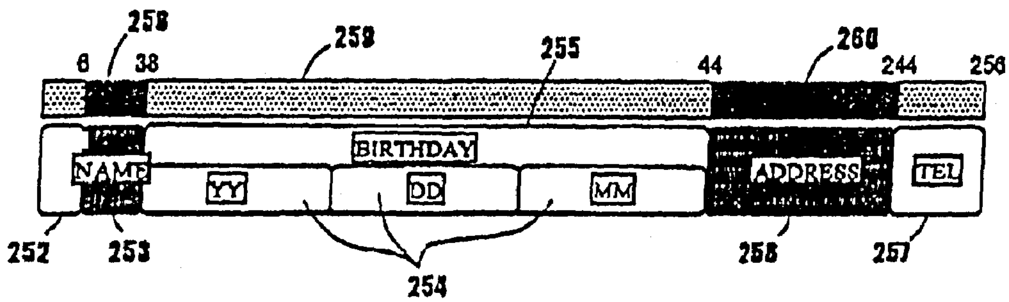

In FIG. 2(*b*), the whole of one record displayed on the screen with the data item 204 for the data item name "BIRTHDAY" magnified. Because the data item for "BIRTHDAY" has been expanded, the data items for "NAME" and "ADDRESS" which are reduced in size. In the conventional FIG. 2(B) display, it has not been possible to determine which data item is magnified or reduced without comparing the scales 212 and 228.

In accordance with the present invention, in FIG. 2(*c*) in order to recognize at one glance that the data items 253 and 256 for "NAME" and "ADDRESS" are reduced, and scale portions 258 and 256 corresponding thereto are displayed in a deep or intense color. Since data item 255 for "BIRTHDAY" is a magnified version of data item 204, It is displayed with lighter or less intense color than data item 204. Thus, the magnification of item 255 can be recognized at one glance.

Specifically, the reduced portion is displayed with its color intensity deepened in proportion to its reduction ratio. While magnified portion is displayed with its color intensity lightened in proportion to its magnification ratio. Thus, the displayed color is changed according to the change of the magnification/reduction ratio.

Accordingly, a user working on the record design and the like can easily determine which portion is magnified and which portion is reduced, and the extent of the magnification or reduction.

Figure 3:
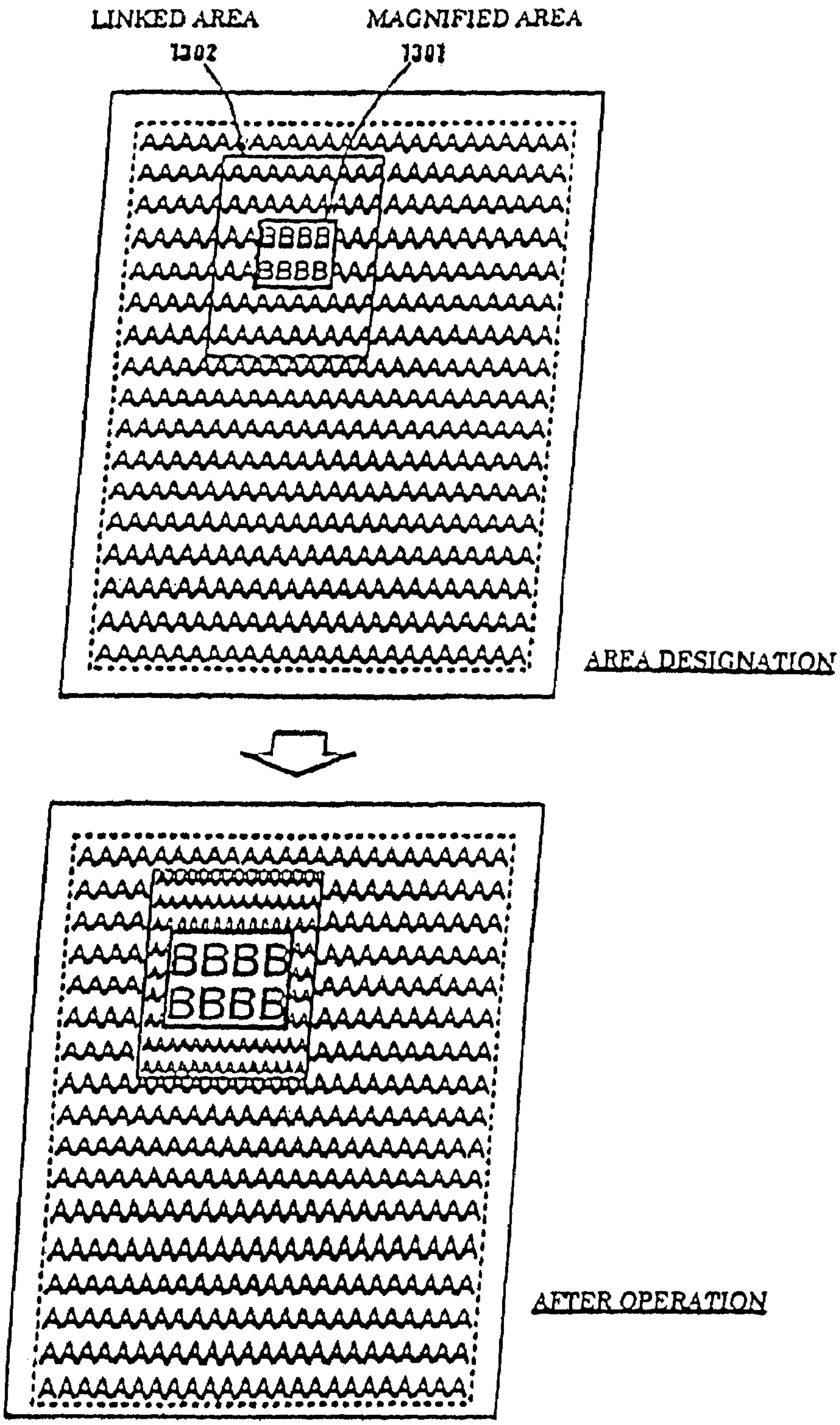
FIG. 3 illustrates using a change of the pattern density to indicate a change in size.

FIG. 3 shows the difference of a display before and after an operation where an area 1301 is a magnified area, an area 1302 surrounding the area 1301 is designated as a linked area. It is not the shade of color, but the pattern densities of the areas 1301 and 1302 that are changed to enable detection of the magnified/reduced areas at a glance. Specifically, when the area 1301 in FIG. 3 is magnified and displayed, and the area 1302 is reduced as a result, the pattern B of the area 1301 is magnified and displayed while the pattern A of the area 1302 is reduced and displayed with respect to the other portions of the diagram.

Figure 4:
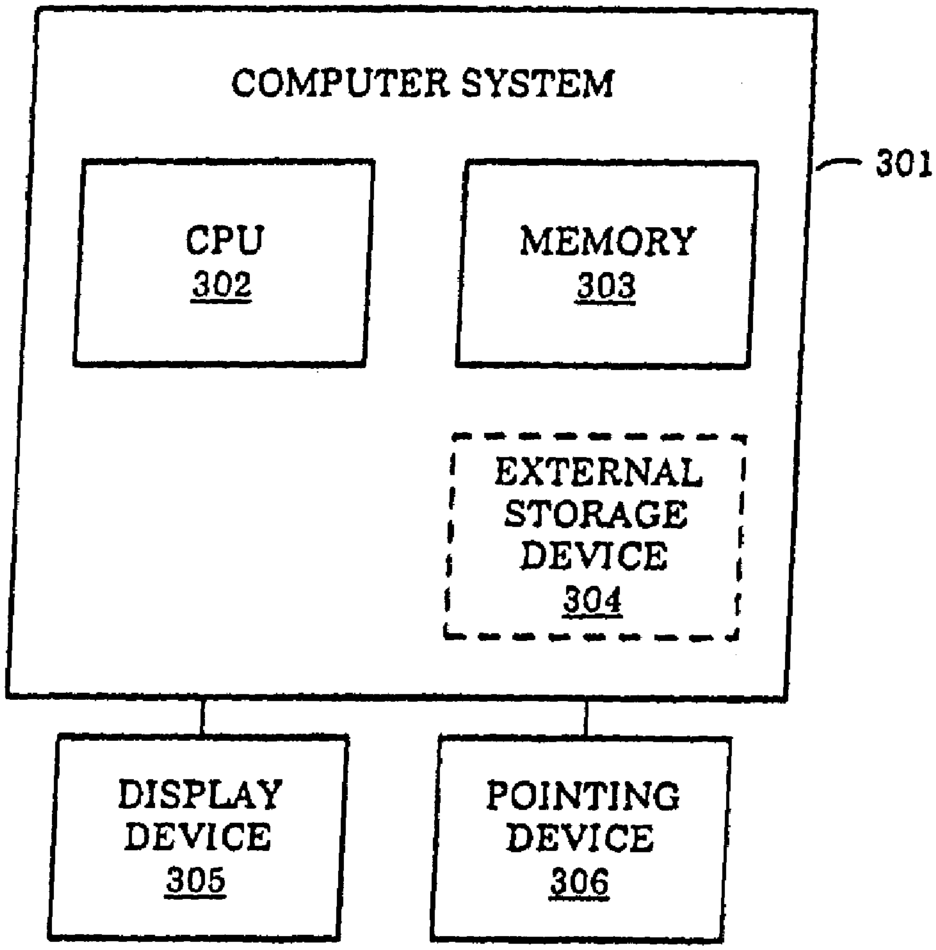
FIG. 4 is a block diagram of the hardware according to the present invention.

FIG. 4 shows a view of hardware according to the present invention.

A computer system 301 comprises: a CPU 302 including a microprocessor, a peripheral circuit thereof and the like; a memory 303; an external storage device 304 such as a floppy disc and a CD-ROM; a color display device 305; and a pointing device 306. The output of the application program is displayed on the external color display device 305. Navigation in the application program is performed with the pointing device 306 such as a mouse.

An operating system and the application program including the method of the present invention are loaded into the memory 303. Information concerning the "data items" and the "record," which are to be processed, is also loaded into the memory 303.

Figure 5:
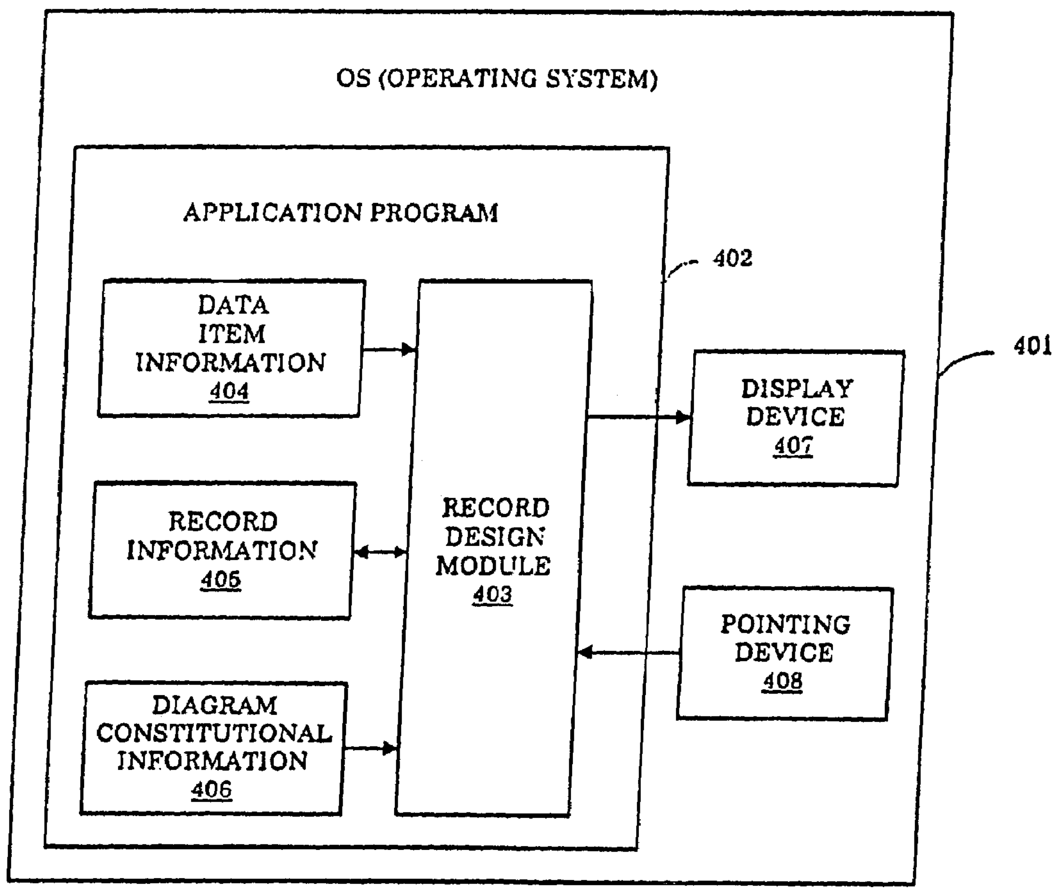
FIG. 5 is a block diagram of the software according to the present invention.

FIG. 5 shows a constitution of software to which the present invention is applied.

Data item information 404, record information 405 and diagram configuration information 406 are loaded by an application program 402 associated with an objective diagram, and then inputted to a record design module 403. When a change is executed on a work record in the record design module 403, the record information 405 is updated.

The diagram configuration information 406 has profile information including display specification information including the color and/or the pattern changes when the diagram is changed, information for a scale display and linkage information between the magnified/reduced portions of the diagram and the other portions. Activation of the application program 402, input of the information of the pointing device 408, output of the information to the display device and the like are performed through an operating system (OS) 401. When a diagram is manipulated with the pointing device 408, the OS 401 transmits the information concerning the selected diagram and the magnification/reduction operation for the diagram to the application program 402., the application program 402 can obtain the information.

The output to the display device 407 is changed with use of an image drawing library of the OS 401.

Figure 6:
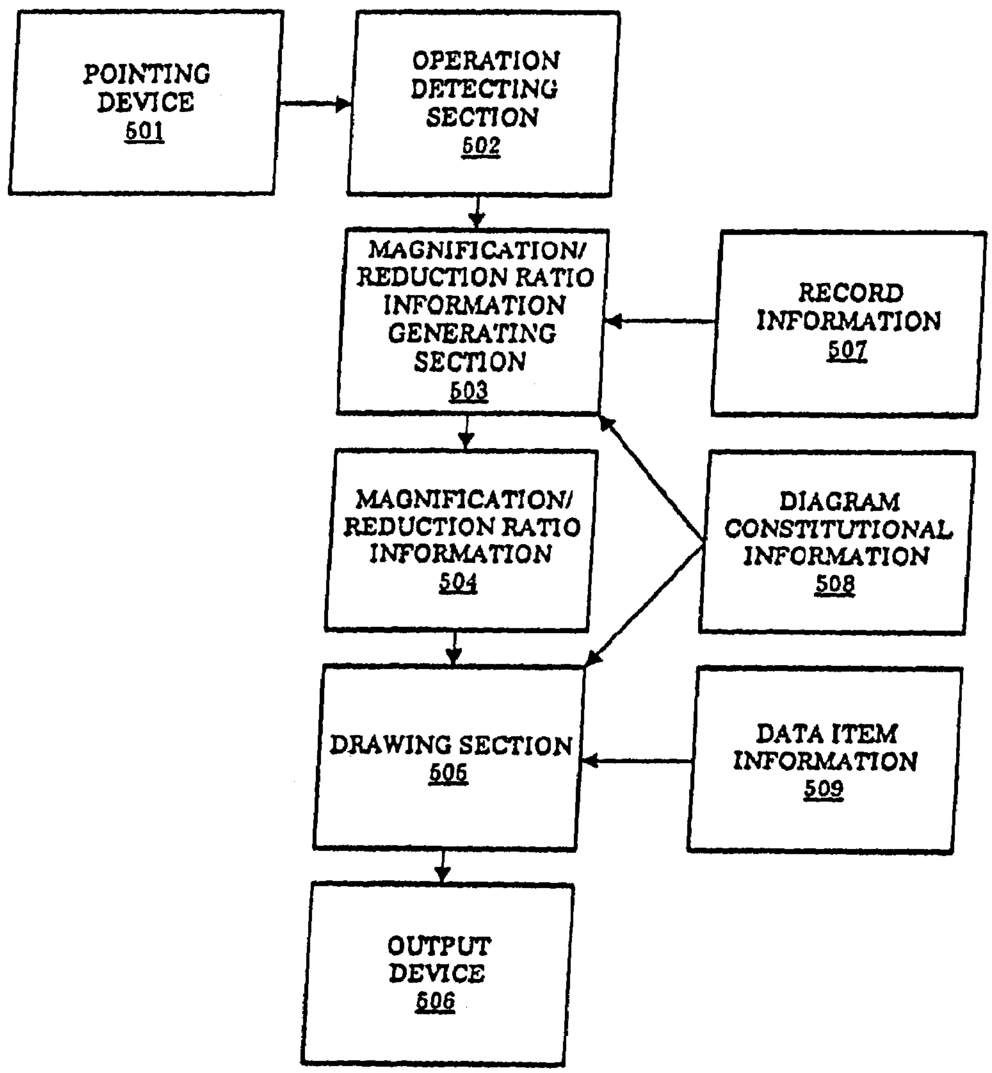
FIG. 6 is a block diagram of the record design module.

Next, a constitution of the record design module 403 will be described with reference to FIG. 6.

Record information 507 associated with an objective diagram for operation, diagram configuration information 508 for profile information of the display, and data item information 509 are stored respectively in the memory. The record information 507 is the initial display information of the record, such as that shown in FIG. 2(A).

The diagram configuration information 508 includes profile information including the display specification information for the color and pattern of the diagram of each area, such as shown in FIG. 2(*c*). For example, the information for the scale display and the linkage information between the magnified or reduced portions diagram and the other portion of the diagram. Data item information 509 is information concerning variables such as "NAME", "ADDRESS" and "TEL" existing within one record.

Information detected with a pointing device 501 is sent to an operation detecting section 502. Magnification/reduction ratio information generating section 503 prepares magnification/reduction ratio information 504 for each portion of the diagram based on operation information from the operation detecting section 502 and the diagram configuration information 508 including the linkage information showing relationship among the portions of the diagram. At initial processing, basic information of an objective record for operation is obtained based on the record information 507.

In a drawing section 505, the diagrams are respectively magnified and reduced. And, the magnification or reduction ratio 504, and the shade of color and the pattern density, corresponding to the portions of the diagram, are set. At this time, from the specification regarding the display in the diagram configuration information 508, the displayed color or pattern is selected, and the scale is displayed. Then, final information concerning the objective diagram for drawing is prepared, and outputted to a display device 506.

Figure 7:
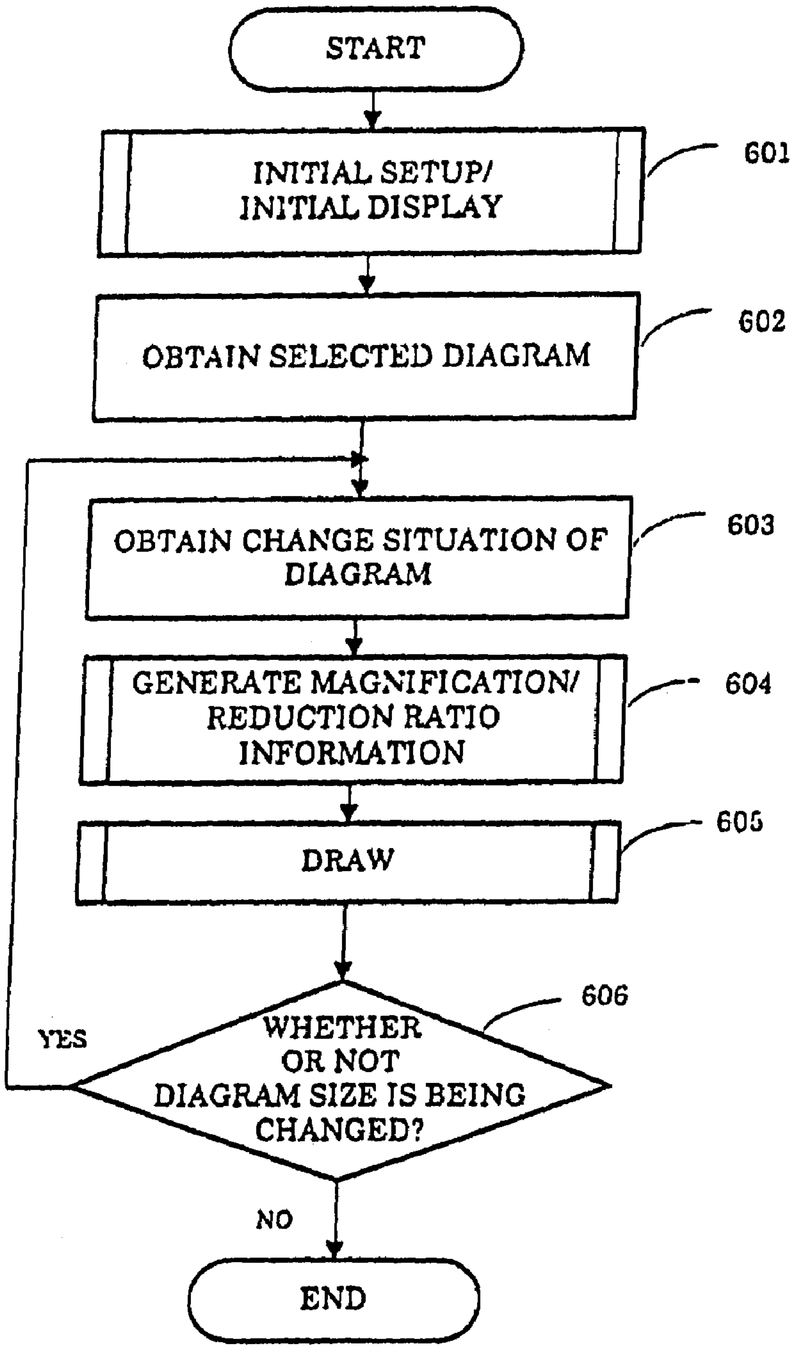
FIG. 7 is a flowchart of the record design.

Next, operations of the record design module 403 will be described with reference to FIG. 7.

In step 601, the initial setup and display are generated on the display device. Next, in step 602, the portion of the diagram selected with the pointing device is obtained. Then, in step 603, change status information concerning the area of the diagram magnified/reduced with the pointing device is obtained. The changes in the status information as to how the selected diagram is magnified or reduced based on the information indicated with the pointing device. Next, based on the above-described information, the magnification/reduction ratio information for each portion of the diagram is prepared in step 604. In step 605, drawing of the images is performed based on the magnification/reduction ratio information. In step 606, it is determined whether the user is operating the pointing devices to change the size of portions thereof or has finished. If the operation is finished, the processing is terminated. When the operation is on going, steps 603, 604 and 605 are reiterated.

Figure 8:
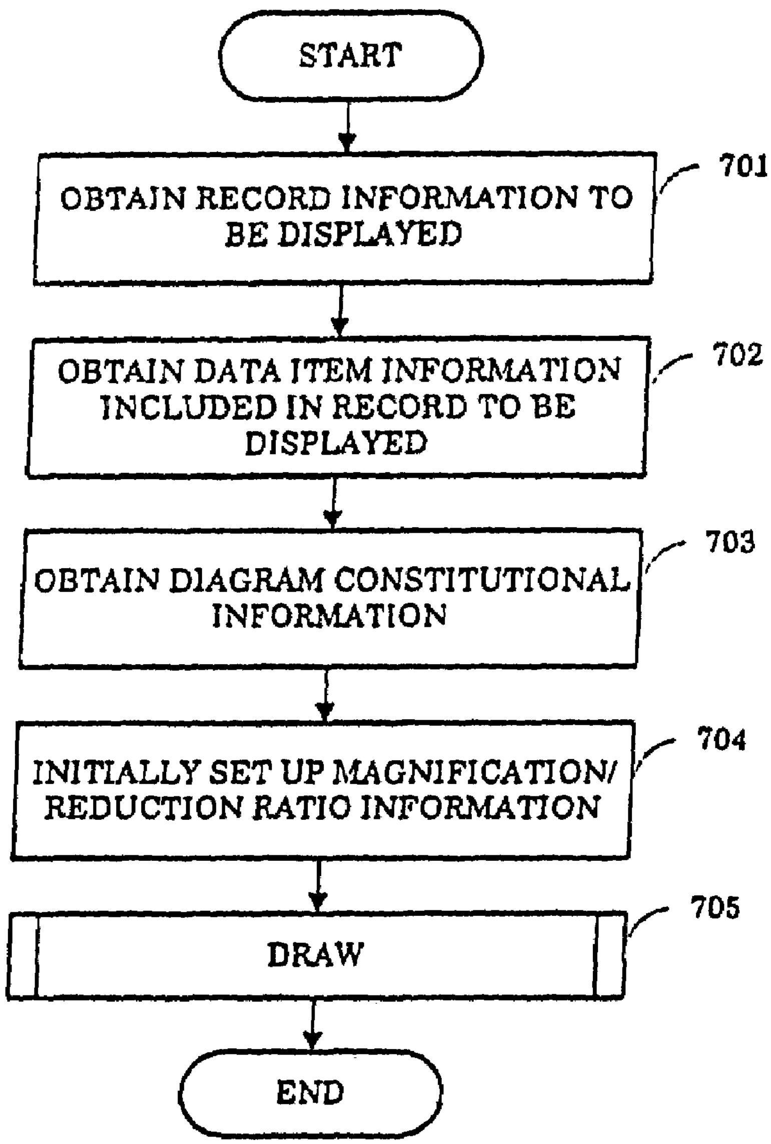
FIG. 8 is a flowchart of the initial setup/initial display.

Next, operations of the initial setup and the initial display of step 601 in FIG. 7, will be described with reference to FIG. 8.

In step 701, record information 507 to be displayed is stored in the memory. In step 702, data item information included in the diagram to be displayed is obtained from the data item information 509, and stored in the memory. In step 703, diagram configuration information as the profile information including the information concerning the color and the pattern which are needed for the display and the linkage information between the magnified/reduced diagram and the other diagrams at the time of operating the diagram, is obtained from the diagram configuration information 508, and stored in the memory. In step 704, initial magnification/reduction ratio information for each diagram corresponding to each data item in the record to be displayed is prepared from the loaded record and data item information. Then, in step 705, drawing is performed for the initial status, thus terminating the processing.

Figure 9:
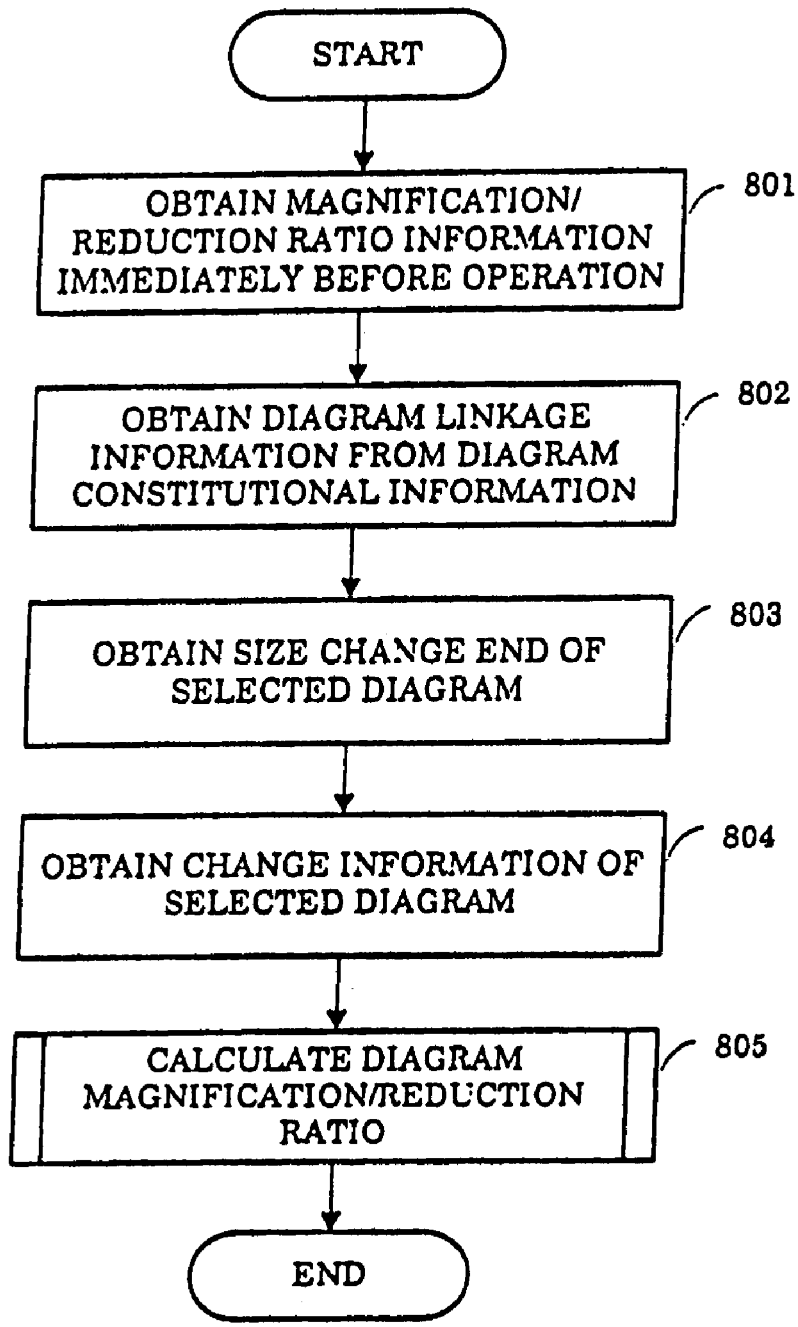
FIG. 9 is a flowchart of the magnification/reduction ratio information generating section.

Next, operations of the magnification/reduction ratio information generating section of step 604 in FIG. 7 will be described with reference to FIG. 9.

In step 801, the magnification/reduction ratio information immediately before an operation is performed for the diagram in the area selected with the pointing device is obtained. In step 802, the diagram linkage information is obtained from the diagram configuration information. In step 803, information is obtained concerning the end of the size-changed diagram. That is, information is obtained as to which portion of the diagram is to be changed in response to the operation of the pointer device. In step 804, information indicating in which direction and to which extent the end of the size-changed area of the objective diagram is to be moved is obtained. Then, in step 805, magnification/reduction ratio of the portions of the diagram is calculated thus terminating the processing.

As pointed out previously, when a portion of a diagram is magnified, the other portions of the diagram must be reduced in order to display the whole of the diagram on one screen. For this reason, the linkage information among such portions of the diagram is obtained in step 802. And in step 803, position information as to the end of the size-changed area of the selected diagram is obtained. Then in step 804, the moving distance information as to the ends of the area to be changed in size is obtained. Based on the above described information and considering the magnification or reduction ratio in existence immediately before the operation, obtained in step 801, the magnification/reduction ratio for each diagram is calculated in step 805.

Next, the operation of the drawing section will be described with reference to FIG. 10.

Figure 10:
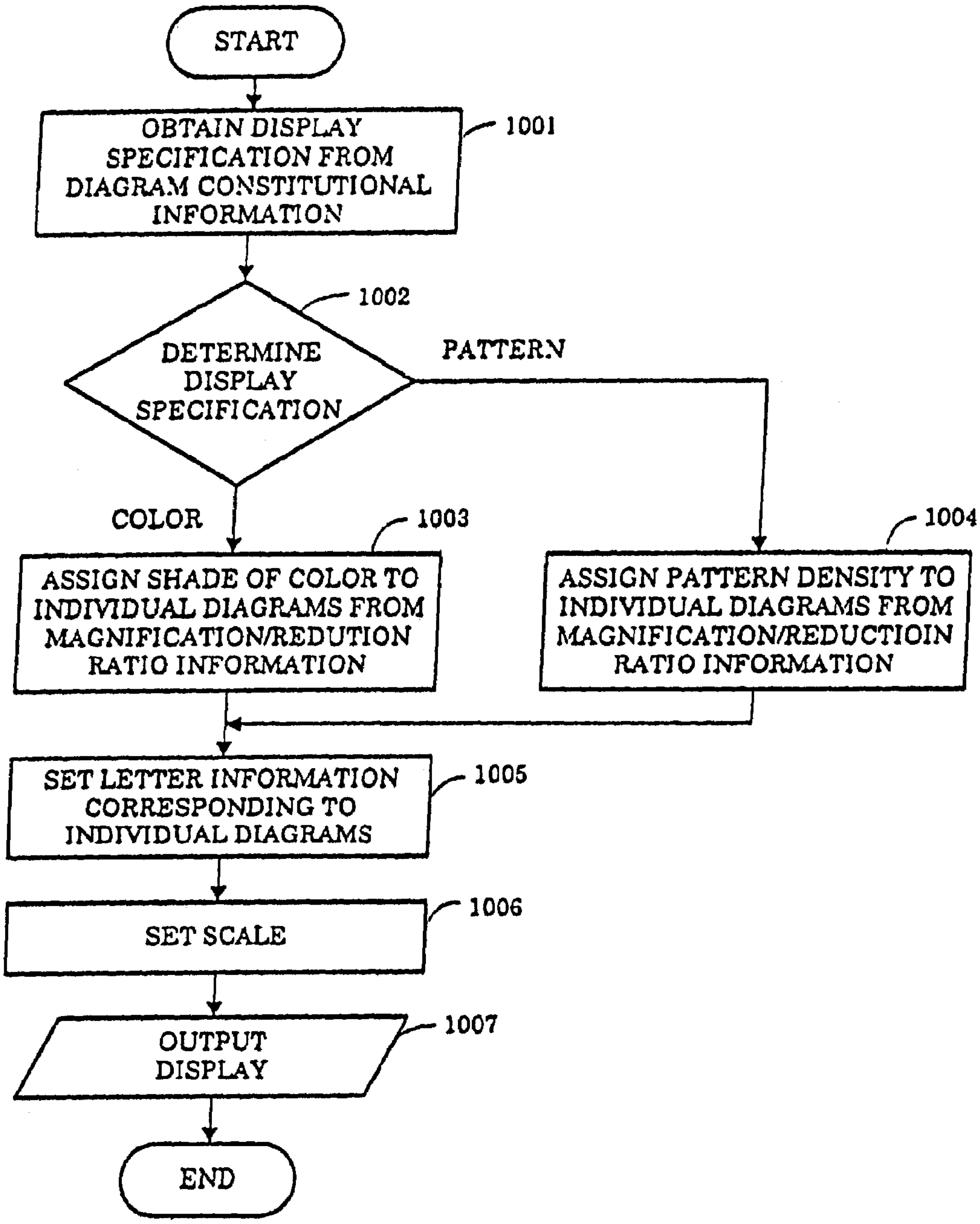
FIG. 10 is a flowchart of the drawing section.

In step 1001 of FIG. 10, the display specification information including the display color and pattern is obtained from the diagram configuration information. Then in step 1002, the display specification is determined. Next, when the display is to use shades of color to distinguish between expanded and reduced sections, the corresponding shade of color is applied to each portion of the diagram from the magnification and/or reduction ratio information in step 1003. Alternatively, when the display is to use pattern density to distinguish between expanded and reduction sections of the diagram, the corresponding pattern density is applied to each section of the diagram from the magnification and/or reduction ratio information in step 1004. It will be understood to those skilled in the art that, as a matter of course, the shade of color and the pattern density can be used together, and other than the above-described, various alternative modifications of the diagram display such as flashing of the magnified area can be used.

Where written information such as the data items corresponding to the diagrams, such as that shown in FIG. 2, exists, the written information is set in step 1005. In step 1006, when a scale display is designated in the information read in step 1001, the configuration scale is set based on the magnification/reduction ratio information as shown in FIG. 2. Note that, also as shown in FIG. 2, the display of the shade in the color of the scan can vary corresponding to the magnification and/or reduction ratio of the underlying portion of the diagram. Then, in step 1007, the display information described above is written in the output device, thus terminating the processing. Advantage of the above described embodiment should be apparent. Since the magnified/reduced diagram is linked with the shade of color, the pattern density and the like, which correspond to the magnification or reduction ratio, then, the display of the diagram is changed, a user can easily determine which area is magnified or reduced and to which extent the area has been magnified or reduced. Accordingly, for editorial work and the like, the ratio of the work area relative to the whole diagram can be visually grasped. Thus, the present invention can provide a user interface having great work efficiency.

Moreover, according to the present invention, the display can be changed in accordance with every magnification or reduction operation of a user.

Furthermore, not only the whole diagram is adapted to the display by reducing the other portions when a certain area is magnified, but also the magnified/reduced area and the linked area affected by the magnified/reduced area can be designated. Thus, an easy-to-use user interface can be realized.

The present invention has now been described with reference to an embodiment. From what has been described, it should be apparent to those having common knowledge in the art will easily understand that applications and modifications can be made to this embodiment without departing from the spirit and the scope thereof. For example, directories of a personal computer are taken as an application example of the present invention. In this case, a ratio of a total file capacity held by the directory relative to a whole hard disc capacity, or a ratio of a number of files held by the directory relative to a number of whole files in the hard disc, can be displayed by means of the corresponding shade of color and pattern density. In order to realize the above, the ratios of the directory are calculated at the stage of the initial display, the ratio calculation is re-executed at the timing when the user adds/deletes a file or designates a display update, thus performing the display corresponding to the calculation result. The above-described method can be applied to all kinds of displays adapted to visually present a number/capacity between a whole and a divided individual. Moreover, in the present invention, instead of always displaying the whole diagram, an area desired to be magnified/reduced can be designated by an operation of a user, and another magnified/reduced area linked thereto can be also designated. Therefore, it should be understood that the present invention is not limited to the disclosed embodiment but is determined by the spirit and scope of the appended claims.

What is claimed is:

1. A method of displaying a diagram in an altered state containing magnified or reduced areas of the diagram, comprising the steps of:

a) storing diagram linkage information as to how display information as to portions of a diagram are affected as to two or more of length, size, shade of color and pattern density when a certain portion of data in the diagram is magnified or reduced with respect to other portions of the diagram;

b) uniformly magnifying or reducing the certain portion of the diagram all with a single designated magnification or reduction ratio;

c) magnifying or reducing at least one but not all of the other portions of the diagram other than the magnified or reduced portion of the diagram in accordance with the diagram linkage information to compensate for changes in the at least one line;

d) obtaining display specification information characterizing the magnification or reduction ratio of each portion of the diagram; and e) displaying each portion of the diagram based on the display specification information characterizing each magnified or reduced portions magnification or reduction ratio wherein at least one of the shade of color and pattern density of changed portions of the diagram and the corresponding portions of the scale are changed in correspondence to the magnification or reduction ratios of these changed portions to distinguish such changed portions from one another and from portions of the diagram that have not been magnified or reduced in steps b) and c) so that the portions of the diagram are characterized differently depending on their magnification or reduction ratio in the display wherein said diagram is lines of alphanumeric characters and said certain portion is a magnified area of the characters including some but not all characters on some but not all lines of said characters and said reduced portions are characters in a frame surrounding said magnified area that includes characters surrounding the magnified area where the characters in both the magnified and reduced areas retain their character shape.

2. An apparatus for displaying a diagram with a magnified or reduced area, comprising:

means for storing diagram linkage information as to how size and pattern density of other portions of a diagram are affected when a certain portion of a diagram is magnified or reduced;

means for magnifying or reducing the certain portion of the diagram with a designated magnification or reduction ratio;

means for magnifying or reducing the other portions of the diagram other than the magnified or reduced portion of the diagram in accordance with the diagram linkage information;

means for obtaining the display specification information corresponding to the magnification or reduction ratio of each of the portions of the diagrams; and means for displaying each portion of the diagram based on the display specification information characterizing to each portion magnification or reduction ratio so that the pattern densities of the different portions of the diagram are characterized differently from each other and from unchanged portions of the diagram depending on their magnification or reduction in the display wherein said diagram is lines of alphanumeric characters and said certain portion is a rectangular magnified area of the characters including some but not all characters on some but not all lines of said characters and said reduced portions are characters in rectangular areas surrounding said magnified area that include some but not all characters surrounding the rectangular magnified area where the characters in both the magnified and reduced areas retain their character shape and proportions.

3. The method according to claim 1, wherein the displaying each portion of the diagram includes the step of displaying a scale indicating the size of the diagram as well as each of the magnified, reduced and unchanged portions of each line of the diagram as they appear in the display.

4. The apparatus according to claim 2, wherein a shade of color of the portions of the diagram is changed in correspondence to their magnification or reduction ratios.

5. A computer program on a computer-readable recording medium for displaying a single page diagram having magnified and reduced areas, wherein the program comprises:

software for diagram linkage information indicating how other portions of a diagram are to be reduced to maintain display of the full diagram when a certain portion of the diagram is magnified;

software responsive to the diagram and image information for magnifying the certain portion of the diagram with a designated magnification ratio;

software for reducing the portions of the diagram other than the magnified or reduced portion of the diagram in accordance with the diagram linkage information to compensate for the increase in the certain portion;

software for obtaining the display specification information characterizing the magnification or reduction ratio of each of the portions of the diagram;

software for displaying each of the portions of the diagram in accordance with the display specification information characterizing each magnification or reduction ratio so that the magnified and reduced portions of the diagram are characterized differently from each other and unchanged portions of the diagram depending on their magnification or reduction ratio in the display wherein said diagram is lines of alphanumeric characters and said certain portion is a rectangular magnified area of the characters including some but not all characters on some but not all lines of said characters and said reduced portions are characters in rectangular areas surrounding said magnified area that include some but not all characters surrounding the rectangular magnified area where the characters in both the magnified and reduced areas are increased and reduced in size respectively but are otherwise undistorted.

6. The computer program according to claim 5 including software for changing the shade of the color of the portions of the diagram to characterize their magnification or reduction ratios in the diagram.

7. The computer program according to claim 5 including software for changing the pattern density of the portions of the diagram characterize to their magnification or reduction ratios in the diagram.

8. The method of claim 1 including the step of linking the displaying of the diagram to a pointing device so that a displayed portion is magnified when the area is pointed to by the pointing device.

9. The method of claim 8 including the step of providing a numeric indication as to the number of bits in each displayed portion in that each portions unchanged state.

10. The apparatus of claim 2 including means for linking the displaying of the diagram to a pointing device so that a display area is magnified when that area is pointed to by the pointing device.

11. The method of claim 3 including the step of providing a numeric indication as to the number of bits in the unchanged state of each portion along with a bar diagram indicating the changed state of each portion in said scale.

12. The computer program of claim 5 including software for linking the displaying of the diagram to a pointing of the diagram to a pointing device so that a display area is expanded when that area is pointed to by the pointing device.

13. The method of claim 1 including the step of linking the displaying of the diagram to a pointing device so that a display area is expanded when that area is pointed to by the pointing device.

14. The method of claim 13, wherein the magnified and reduced areas are rectangular in shape.

15. The method according to claim 14 including the step of changing the shade of color of the portions of the diagram to characterize their magnification or reduction ratio in the diagram.

16. The method according to claim 14 including the step for changing the pattern density of the portions of the diagram to characterize their magnification or reduction ratio in the diagram.

* * * * *